United States Patent [19]

Lee

[11] Patent Number: 4,594,794
[45] Date of Patent: Jun. 17, 1986

[54] DEVICE FOR SOLIDS AND FLUID HANDLING AND DISTRIBUTION IN A MAGNETICALLY STABILIZED FLUIDIZED BED

[75] Inventor: Wei-Kuo Lee, Bridgewater, N.J.

[73] Assignee: Exxon Research and Engineering Co., Florham Park, N.J.

[21] Appl. No.: 669,899

[22] Filed: Nov. 9, 1984

[51] Int. Cl.[4] .......................................... F26B 17/10
[52] U.S. Cl. ...................................... 34/57 A; 34/1; 34/10
[58] Field of Search ............. 34/10, 57 A, 57 R, 102, 34/1; 432/15, 58; 406/89, 90, 91

[56] References Cited

U.S. PATENT DOCUMENTS

| | | | |
|---|---|---|---|
| 2,429,721 | 1/1944 | Jahnig | 196/52 |
| 2,639,973 | 5/1953 | Fritz | 23/1 |
| 2,883,332 | 10/1956 | Wickham | 208/74 |
| 3,208,833 | 9/1965 | Carson | 23/288 |
| 3,214,247 | 10/1965 | Broughton | 23/288 |
| 3,309,305 | 2/1966 | Scott | 208/111 |
| 3,439,899 | 4/1969 | Hershler | 299/1 |
| 3,440,731 | 4/1969 | Tuthill et al. | 34/1 |
| 3,523,762 | 8/1970 | Broughton | 23/285 |
| 4,115,927 | 9/1978 | Rosensweig | 34/1 |
| 4,132,005 | 1/1979 | Coulaloglou | 34/10 |
| 4,136,016 | 1/1979 | Rosensweig | 208/134 |
| 4,143,469 | 3/1979 | Kamholz | 34/1 |
| 4,247,987 | 2/1981 | Coulaloglou et al. | 34/102 |
| 4,274,987 | 6/1981 | Augustya | 260/23 H |
| 4,292,171 | 9/1981 | Mayer et al. | 208/164 |
| 4,294,688 | 10/1981 | Mayer | 208/164 |
| 4,319,892 | 3/1982 | Waghorne et al. | 55/60 |
| 4,319,893 | 3/1982 | Hatch et al. | 55/60 |
| 4,349,967 | 9/1982 | Jones et al. | 34/102 |
| 4,373,272 | 2/1983 | Jones et al. | 34/57 A |

FOREIGN PATENT DOCUMENTS 0074815  3/1983  European Pat. Off. .

OTHER PUBLICATIONS

Zhurnal Tekhnicheskoy Fiziki, 30 (9):1081–1084 (1960).
Izvestiya Akad. Nauk., Latviiskoi SSR, 12(173): 47–51.
Izvestiya Akad. Nauk.: Latviiskoi SSR, 12:52–54 (1961).
Aspects of Magnetohydrodynamics and Plazma Dynamics, Riga (1962), Izvestiya Akad. Nauk., Latviiskoi SSR, pp. 637–645.
Bologa and Syutkin, Electron Obrab Mater, 1:37–42 (1977).
Ivanov et al., Kinet. Kavel, 11(5):1214–1219 (1970).
Ivanov et al., Zhurnal Prikladnoi Khimii, 43, 2200–2204 (1970).
Ivanov et al., Zhurnal Prikladnoi Khimii, 45:248–252 (1972).
Shunkov et al., Zhurnal Prikladnoi Khimii, 49 (11):2406–2409 (1976).
R. E. Rosensweig, Science, 204:57–60 (1979).
Ind. Eng. Chem. Fundam., 18 (3):260–269 (1979).
D. Kunni and O. Levenspiel, Fluidization Engineering, Wiley (1969) pp. 29–30.

Primary Examiner—Larry I. Schwartz
Attorney, Agent, or Firm—E. Thomas Wheelock

[57] ABSTRACT

This invention relates to an apparatus or means for improving solid and fluid handling and distribution in magnetically stabilized fluidized beds. These devices decouple the solids and fluid flows in a buffer zone at the fluid introduction or withdrawal points in a bed and therefore achieve good radial fluid mixing otherwise lacking in such fluidized beds.

33 Claims, 12 Drawing Figures

DEVICE FOR SOLIDS AND FLUID HANDLING AND DISTRIBUTION IN A MAGNETICALLY STABILIZED FLUIDIZED BED

FIELD OF THE INVENTION

This invention relates to an apparatus or means for improving solids and fluid handling and distribution in magnetically stabilized fluidized beds. These devices decouple the solids and fluid flows in a buffer zone at the fluid introduction or withdrawal points in a magnetically stabilized fluidized bed and therefore permit the achievement of good radial fluid mixing otherwise lacking in such fluidized beds.

BACKGROUND OF THE INVENTION

Numbers of workers have studied the influence of magnetization on the dynamics of gasfluidized solids in batch beds. An early account of this phenomena was reported by M. V. Filippov [*Applied Magnetohydrodynamics, Trudy Instituta Fizika Akad. Nauk.*, Latviiskoi SSR 12:215-236 (1960); *Zhurnal Tekhnicheskoy Fiziki*, 30 (9):1081-1084 (1960); *Izvestiya Akad. Nauk.*, Latviiskoi SSR, 12(173): 47-51 (1961); *Izvestiya Akad. Nauk.:Latviiskoi SSR*, 12:52-54(1961); and Aspects of Magnetohydrodynamics and Plazma Dynamics, Riga (1962), *Izvestiya Akad. Nauk.*, Latviiskoi SSR, pp. 637 to 645]. Subsequent workers have reported on the influence that magnetization exerts on pulsations, heat transfer, structure, and other characteristics of magnetized and fluidized solids in batch beds. A review of some of this work is given by Bologa and Syutkin [*Electron Obrab Mater*, 1:37-42 (1977)]. Ivanov and coworkers have described some benefits of using an applied magnetic field of fluidized ferromagnetic solids in the ammonia synthesis process and some of the characterizations for this process [see British Pat. No. 1,148,513 and numerous publications by the same authors, e.g., Ivanov et al, *Kinet. Kavel*, 11(5):1214-1219(1970); Ivanov et al, *Zhurnal Prikladnoi Khimii*, 43, 2200-2204 (1970); Ivanov et al, *Zhurnal Prikladnoi Khimii*, 45:248-252 (1972); Ivanov et al, *Chemical Industry*, 11; 856-858 (1974); Shunkov et al, *Zhurnal Prikladnoi Khimii*, 49 (11):2406-2409 (1976)]. Various means for operating magnetic fields to stabilize the bed of fluidized magnetizable solids have been disclosed in U.S. Pat. Nos. 3,440,731; 3,439,899; 4,132,005 and 4,143,469 and Belgium Pat. No. 865,860 (published Oct. 11, 1978).

R. E. Rosensweig [*Science*, 204:57-60 (1979), *Ind. Eng. Chem. Fundam.*, 18 (3):260-269 (1979) and U.S. Pat. Nos. 4,115,927 (now reissued as U.S. Pat. No. Re. 31,439 on Nov. 15, 1983) and 4,136,016 (now reissued as U.S. Pat. No. Re. 31,186, on Mar. 22, 1983)] reported on a number of features of magnetically stabilized fluidized magnetizable solids and a systemmatic interpretation of the phenomena. In these publications and patents, R. E. Rosensweig reported on the quiescent fluid-like state for the magnetically stabilized fluidized bed (MSB), particularly one which is totally free of bubbles or pulsations when a uniform magnetic field is applied to a bed of magnetizable solids, approximately colinear with the direction of the fluidizing gas flow. As such, this magnetic stabilization produces an unbubbling fluid state having a wide range of operating velocities. These velocities are denoted as a superficial fluid velocity ranging between (a) a lower limit given by the normal minimum fluidization-superficial fluid velocity required to fluidize the bed of solids in the absence of an applied magnetic field, and (b) an upper limit given by the superficial fluid velocity required to cause time-varying fluctuations of pressure difference through the stabilized fluidized bed portion during continuous fluidization in the presence of the applied magnetic field. It is disclosed in Rosensweig's U.S. Pat. No. 4,115,927 that the stably fluidized solids resemble a liquid and as such enjoy the benefits that the solids are facilitated for transport while, concomitantly, the pressure drop is limited to that of a fluidized bed. In addition, the beds exhibit the absence of the backmixing normally associated with fixed bed processes. At column 6, lines 63-66, of the '927 patent, it is stated: "The fluidized bed thus formed has many properties of a liquid; objects float on the surface and the addition or withdrawal of solid particles in process equipment is also facilitated." The '927 patent further states that "orifice discharge tests confirm the ability to transfer solids out of the containing vessel" (column 8, lines 58-59). Further, in column 21, lines 17-24, it is stated: "The utility of the magnetically stabilized compositions in applications such as absorptive or adsorptive separation of vapor species, catalyst utilization and regeneration, particulate filtration, subsequent bed cleaning, reaction of solids in moving beds and allied applications in which bed solids must be transported to and from the bed depend on fluidized solids depending as a medium capable of flowing in response to a pressure differential."

Although Rosensweig discloses the possibility of transporting solids in an magnetically stabilized bed from vessel to vessel, all of the reported experiments involved batch beds.

Others have reported the use of continuously flowing cocurrent or countercurrent magnetically stabilized fluidized beds with a variety of chemical reactions in adsorptive or absorptive processes. U.S. Pat. No. 4,247,987 to Coulaloglou et al, issued Feb. 3, 1981, relates to a process for continuous countercurrent contacting to absorb one species from a contacting fluid by use of at least one magnetically stabilized fluidized bed. Similarly, U.S. Pat. No. 4,292,171, issued Sept. 29, 1981 and U.S. Pat. No. 4,294,688 to Mayer, issued Oct. 13, 1981, disclose catalytic hydrocarbon conversion processes in which magnetizable particles with or without separate catalytic particles are passed countercurrent to the hydrocarbon feed to effect a chemical conversion. U.S. Pat. No. 4,319,892 to Waghorne et al, issued Mar. 16, 1982 and U.S. Pat. No. 4,319,893 to Hatch et al, issued Mar. 16, 1982, teach an adsorption process for the separation of hydrogen from a feed gas or vapor which contains hydrogen in admixture of one or more hydrocarbon components. Each process uses a set of vertically stacked magnetically stabilized fluidized beds to effectuate one or more steps in the adsorption-desorption process. The adsorbent passes through each of the MSBs in a direction countercurrent to its particular gas flow.

However, none of the noted patents suggest the use of fluid redistribution buffer trays in which the fluid flows in a solids-free zone as the solids pass in a separate channel between magnetically stabilized fluidized beds.

It has now been found that although magnetically stabilized fluidized beds offer many advantages as a solid-fluid contactors for chemical processes and separations, in some operations low radial dispersion properties associated with MSB media, as in packed particulate media, can be a deterrent to good fluid mixing or distribution. This is especially true in those instances where uniform feed introduction or product withdrawal is desired; that is to say, that the lack of radial dispersion in a magnetically stabilized fluidized bed may, in some instances, result in residence times which vary to some moderate extent across the diameter of the bed. This problem can be solved in a number of different ways but most of them involve deletion of one or more of the unique benefits attributable to MSBs.

Others teach methods of decoupling solids from fluid flow in fluidized beds. None, however, suggest the buffer means disclosed herein, nor do they suggest such a decoupling in concert with a magnetically stabilized fluidized bed. For instance, U.S. Pat. No. 3,309,305 to Scott, issued Mar. 14, 1967, discloses a vessel containing fluidized beds which are separted by "velocity modifying means". The modifying means are generally some variation of end-to-end truncated cones designated to generally separate passage of solids downwardly from passage of liquid or gas one way or the other. As depicted in Scott's FIGS. 11 and 12, a quench gas may be introduced into the liquid phase through nozzles placed within the velocity modifying means.

Similarly, U.S. Pat. No. 2,429,721 to Jahnig, issued Oct. 28, 1947, suggests the use of a sequence of fluidized beds. Solids flow downwardly through a sequence of vertically oriented beds and the fluidizing gases are removed from the upper end of each bed apparently for subsequent disposal. Additionally, fluidizing gases sent to each bed are said to contain recycled solids.

U.S. Pat. No. 2,639,973 to Fritz, issued May 26, 1953, discloses a column (similar in operation to a bubble-cap distillation tower) containing a series of plates on each of which a fluidized bed is formed. Solids enter the system through an upper inlet and flow to each of the lower fluidized beds through downcomers while the gases flow upwardly through the bubble cap perforated distributor plates.

U.S. Pat. No. 2,883,332 to Wickham, issued Apr. 23, 1959, discloses a vessel containing an upper fluidized bed and a lower fluidized bed with solids from the upper bed flowing through a downcomer to the lower bed. The embodiment shown in Wickham's FIG. 2 discloses that the gases from the lower bed flow through an annular sleeve and bypass the second reaction zone.

Another design for use with fluidized beds was repoted by Jobes, as shown in D. Kunni and O. Levenspiel, *Fluidization Engineering*, Wiley (1969) pp. 29-30. It discloses a two-stage fluidized salt dryer in which a fluidizing gas is withdrawn from the free space above a lower bed, heated, and introduced into an upper bed as the drying medium.

Fluid distributing means for use in or between packed beds are also shown in the literature. U.S. Pat. No. 3,208,833 to Carson, issued Sept. 28, 1965, shows a device for placement in a fixed bed comprising a number of fluid-carrying rings and radials which introduce or remove fluid through axially oriented porous or multi-holed injectors. U.S. Pat. No. 3,214,247 to Broughton, issued Oct. 26, 1965, suggests a chamber between beds with a diametric injector placed in the plane of an interbed baffle. U.S. Pat. No. 3,523,762, also to Broughton, issued Aug. 11, 1970, shows a number of devices for baffling liquid flow between beds. European Patent Application No. 0,074,815, to Haase, published Mar. 27, 1983, shows a complicated arrangement of screens, baffles, and distributors intended to collect the liquid flowing between beds, add or withdraw a liquid at the collection area, and introduce the resulting liquid into a subsequent bed.

As mentioned above, none of these devices disclose an apparatus in which the solids flow through a magnetically stabilized fluidized bed is completely separated from the fluid flow for subsequent distribution into the MSB.

SUMMARY OF THE INVENTION

The present invention is directed to an improved apparatus for effecting fluids-solids contacting under fluidization conditions wherein a bed of suspended magnetizable particles are contacted in a contacting chamber with a fluid stream which passes through the bed either in ascending or descending manner. The bed itself is structured or stabilized by an applied magnetic field having strength sufficient to suppress solids backmixing. The improvement lies in combining a fluid redistribution buffer tray (FRT) with such a bed at its lower end. The FRT may be made up of a number of distinct parts. The FRT assembly usually extends completely across the MSB vessel and has as its upper surface a porous distributor plate adapted to distribute the fluid used as a fluidizing medium in the MSB. The distributor plate may be flat or made up of at least one truncated cone. The standpipe for the upward or downward flow of particulate material is open ended and ends fairly near or above the upper surface of the flat distributor tray. In the instance where cone shaped distributor trays are used, standpipes generally will terminate at their upper end within the apex point of the truncated cones. The standpipe will typically be a closed wall design. The lower end of the standpipe should open either into the next lower MSB or outside the vessel. Optionally, a mesh may be placed across the vessel at the lower end of the standpipe. Typically, the mesh will have a hole therethrough to allow solids to flow up or down the standpipe from the chambers above and below the FRT and yet prevent solids from entering the solids-free zone.

The standpipe, distributor plate, screen mesh and vessel wall form a solids-free chamber at the bottom of discrete MSB. Fluid introduction and extraction means may be placed within this solids-free zone as desired by one having ordinary skill in this art.

Another variation of the invention includes separating the solids-free zone into a number of different chambers with one or more separate fluid removal means in each resulting zone. The added zone walls may be either distributors or solid dividers. Further variations on the invention include the use of cone shape mesh screens or distributors at the lower end of the standpipe. Distributor trays may also be configured to use small standpipe-like passthrough devices with bubble cap means situated on their upper ends to improve gross radial mixing rates.

DESCRIPTION OF THE PREFERRED EMBODIMENTS

As discussed above, this invention is intended to be used in conjunction with magnetically stabilized fluidized beds in which solids are continuously moved upward or downward through the magnetically stabilized area. These devices are intended to decouple the solids from the fluids in a buffer zone placed at the bottom of such a bed. MSBs provide exceptional results in some uses because the solids generally flow as a plug through the stabilized zone. There is little, if any, axial mixing of the solids within the MSB. Non-stabilized fluidized beds typically are characterized as the classic well-mixed reactor. The solid stability within the MSB is not, however, without liability. For instance, there is very little radial dispersion of the fluid throughout the bed once the fluid leaves the distributor plate. Such a situation may be, but not always is, a detriment in some chemical reactions or adsorptive processes. Separate chemical feeds may not sufficiently intermix within the fluid bed and therefore may require an additional stage of premixing before introduction into an MSB chemical reactor.

The devices described herein are for the control and optimization of the solids-fluid distribution in critical regions of an MSB contactor by essentially decoupling those solids and fluid flows. The basic feature of all the inventive devices as shown herein is the creation of a solids-free zone, i.e., a buffer zone, below an MSB. The buffer zone contains a standpipe in which solids or solids and fluids flow up or down depending upon whether the MSB is in cocurrent or in countercurrent operation and a solids-free space or cavity wherein fluid introduction, withdrawal, or mixing can be performed before the resulting fluid is redistributed into the MSB. This device is especially suitable for use between various stages of a multi-MSB column.

Figure 1:
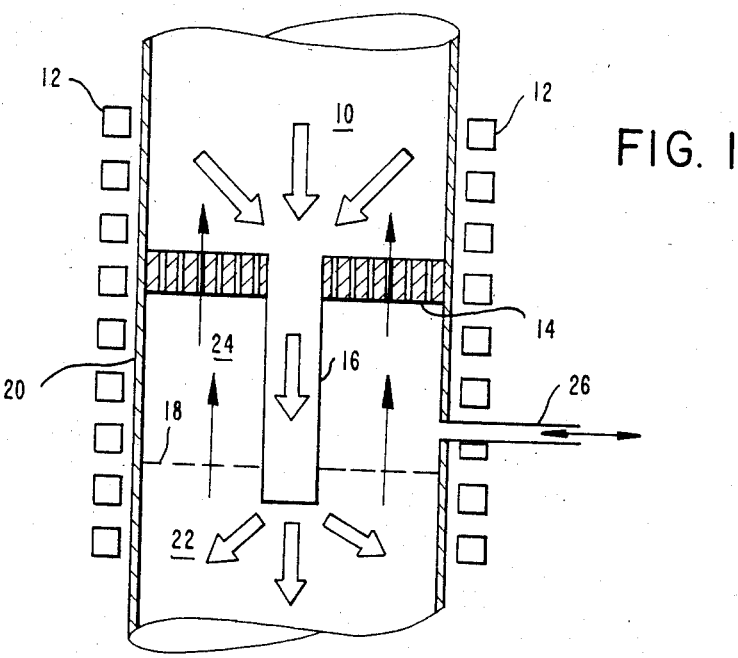
FIG. 1 shows, in schematic side view cutaway, the simplest fluid redistribution buffer tray in combination with magnetically stabilized fluidized bed.

As shown in FIG. 1, the device may be quite simple. In the Figure, the MSB is maintained in the MSB zone 10. The details of how to initiate and maintain an MSB form no portion of this invention and may be readily determined by reference to the Rosensweig patents mentioned above, the entirety of which are incorporated by reference. The magnetic means surrounding the MSB zone are shown at 12. These magnetic stbilizing means extend at least over a portion of the bed but may also extend down to influence the solids flowing within the standpipe. As with any fluidized bed, the solids contained in the bed must be fluidized by a gas or liquid flowing upwardly through the bed. In this drawing the fluid flow, as denoted by the small arrows, proceeds up through distributor grate 14. The distributor, which may be, e.g., a punched plate, a foraminous plate, or a bubble cap-like tray, is configured to provide an even distribution of fluid flow up into the MSB and prevent channeling of the solids contained therein as best as is possible. Shown in the center of distributor grate 14 is a standpipe 16. Standpipe 16 has an open end at or near distributor grate 14 and a lower end near or below solids screen 18. Although only one standpipe 16 is depicted, it should be clearly apparent that more than one standpipe is contemplated in each of the disclosed variations. Both distributor grate 14 and solid screen 18 cover all of the area within the walls of vessel 20 save that area within standpipe 16. Solids screen 18 prevents the upflow of solids particles from lower MSB zone 22 into the solids-free zone 24. The flow of solids in FIG. 1 is countercurrent to the flow of the fluid and is depicted by the large arrows in the drawing. Depending upon the particular application in which the device is used which use in turn determines parameters such as particle size, particle density, fluid velocity, differences in density between the fluidizing fluid and the fluidized solids, etc., the flow of solids be cocurrent (or upward) in the figure. Fluids may be added or withdrawn through line 26. For instance, products from a lower MSB may be withdrawn through line 26 or further reactant may be added for adsorption on the particles found in MSB zone 10. Materials added in line 26 may be thoroughly mixed in solids-free zone 24 before being subjected to the chemical reaction or adsorption taking place in MSB zone 10.

Figure 2:
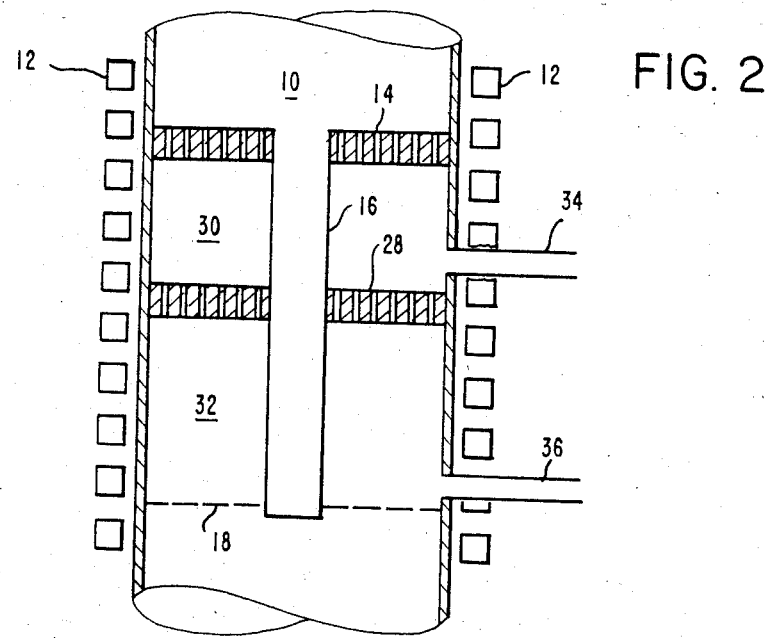
FIG. 2 shows a variation of the device shown in FIG. 1 but having two solids-free zones.

In various applications, the FRT can be constructed with two chambers. FIG. 2 shows just such a variation. As in FIG. 1, this device is placed below a MSB zone 10 having means for providing a magnetic field 12 placed about its periphery. The device also has a standpipe 16 which permits countercurrent or cocurrent flow of solids to the fluidizing gas or liquid. An upper distribution grate 14 and a solids screen 18 perform the same function as the device shown in FIG. 1. The major differences here lie in the insertion of an additional or lower distributor grate 28 so as to form two solids-free zones: an upper zone 30 and a lower zone 32. Each of the upper zone 30 and lower zone 32 has associated with it a fluid line, respectively 34 and 36. The lower distribution grate 28 provides an additional measure of fluid mixing before mixed fluid is contacted with the solids in MSB zone 10. Fluids may, of course, be withdrawn or injected from either line 34 or line 36 depending upon the needs of the process involved. Care need be taken, of course, to maintain sufficient fluid flow in the MSB zone 10 to maintain fluidization conditions.

Figure 3:
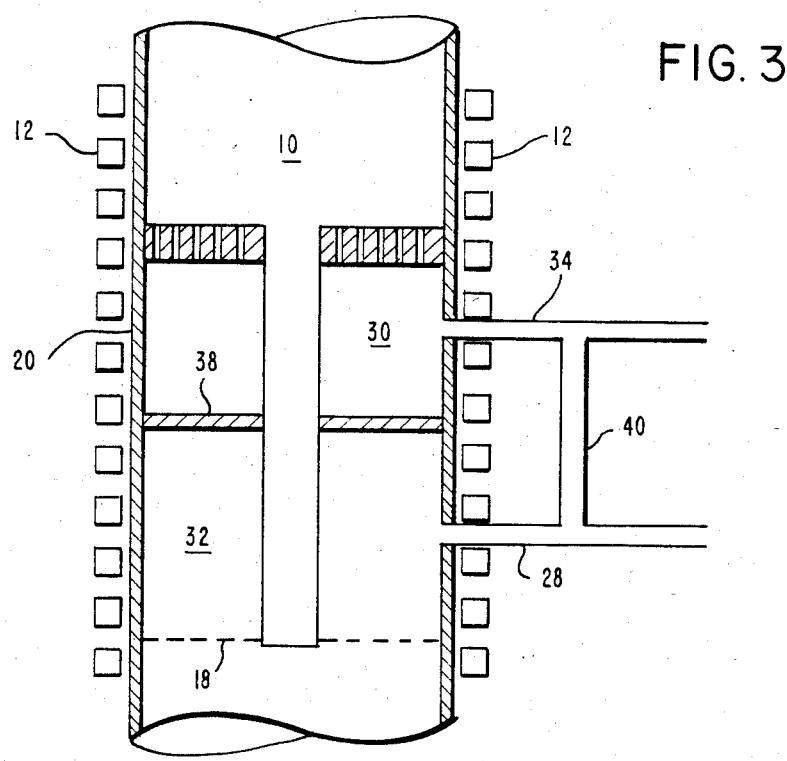
FIG. 3 shows a side view schematic cutaway device made according to the invention having two solids-free zones and an impermeable partition allowing complete removal of liquid from the solids-free zone.

FIG. 3 shows a variation of the two chamber design shown in FIG. 2, but instead of an additional distributor grate the solids-free zone is divided into two discrete solids-free domains by a solid partition plate 38. The lower fluid line 28 coming from the lower solids free zone and the upper fluid line 34 coming from the upper solids-free zone 30 may be used to effectuate heat exchange or mixing or addition of further reactants external to the vessel 20. There may be a pumparound through line 40 to permit good control of fluidization conditions in MSB zone 10.

Figure 4:
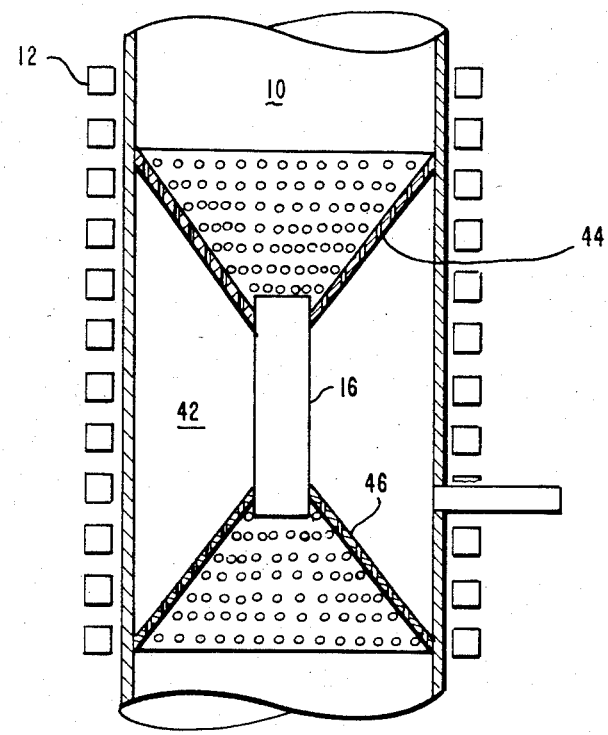
FIG. 4 shows a side view schematic cutaway device made according to the invention using truncated conical fluid distributors and solids control screens.

It is contemplated that the distributor plate used in this invention need not be perfectly level and flat. For instance, as shown in FIG. 4, the solids-free zone 42 is formed beneath a conical distributor grid 44. This form of distributor may be useful in those instances where the MSB is operated in countercurrent flow and the magnetizable particles found in MSB zone 10 are of irregular shape. Such a shape allows ease of flow from the MSB zone down through standpipe 16 for further processing below. Furthermore, in the instance where multiple standpipes are used, each standpipe may have a conical distributor grid similar to that of 44.

The device in FIG. 4 additionally shows the presence of a lower conical solids guard 46. The guard is shown in the form of a conical perforated plate. A simple conical mesh screen would be suitable in most situations. The conical screen or guard is usually suitable in those circumstances where the solids flow is generally cocurrent with the fluidizing fluid flow, or may be used to permit expansion of the next lower bed into the solids-free zone. The screen 18 shown in FIGS. 1-3 may be replaced by the solids guard 46.

Figure 5:
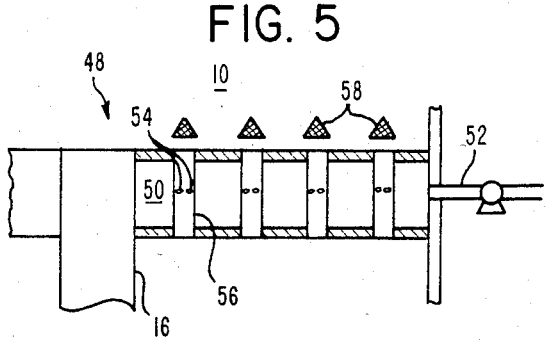
FIG. 5 shows a detailed schematic side view cutaway of a distributor grid adapted to allow removal or addition of fluid within the grid. Solids flow through the distributor is prevented by the use of conical screens.
Figure 6:
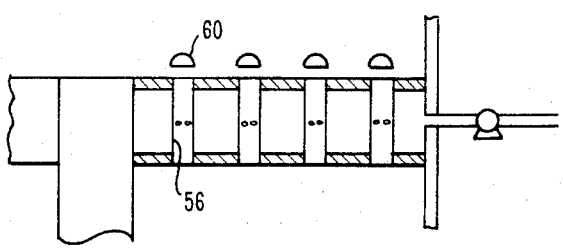
FIG. 6 shows a side view schematic cutaway similar to the device disclosed in FIG. 5 using bubble caps to control solids downflow.

If a low pressure drop is needed across the distributors, such as 14 shown in FIG. 1, cap openings assembled in a manner shown in FIGS. 5 and 6 may be used. FIG. 5 shows the detail of a hollow distributor 48 with the optional screens 58. Distributor 48 is made up of two plates which form a distributor chamber 50. The chamber is adapted to allow the introduction of fluids or withdrawal of fluids through lines 52 or any similar head pipe. Those fluids flow from or to orifices 54 placed in flowthrough tubes 56. Flowthrough tubes 56 are open at their upper end to MSB zone 10 and the solids-free zone below hollow distributor 48. The orifices 54 are open between distributor chamber 50 and the interior of flowthrough tubes 56. To prevent substantial solids downflow from MSB zone 10 through the flowthrough tubes 56, a set of conical screens 58 may be placed above the upper end of flowthrough tubes 56.

A variation on the device shown in FIG. 5 is shown in FIG. 6. However, instead of conical screens being used at the upper end of flow through tubes 56, well known bubble caps 60 are placed at the upper end of flowthrough tubes 56 to prevent substantial solids flow therethrough.

Figure 6A:
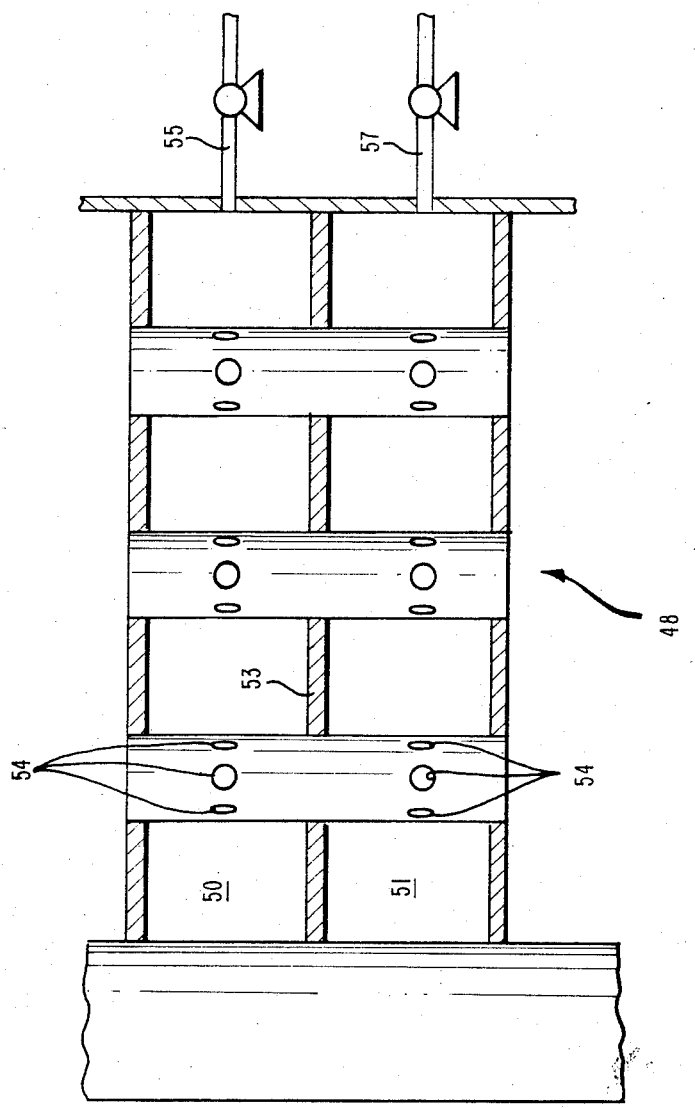
FIG. 6A shows a multiple solids-free zone as variations of the distributor shown in FIGS. 5 and 6.

FIG. 6A shows a variation of the distributor shown either in FIGS. 5 or 6. The distributor 48 has an upper solids free zone 50 and a lower solidsfree zone 51. The barrier 53 physically separating the two zones may be porous, solid or a screen depending upon the use to which the surrounding equipment is put. As was the case with the devices shown in FIGS. 2 and 3, fluids may be independently withdrawn or introduced through line 55 or 57.

Figure 7:
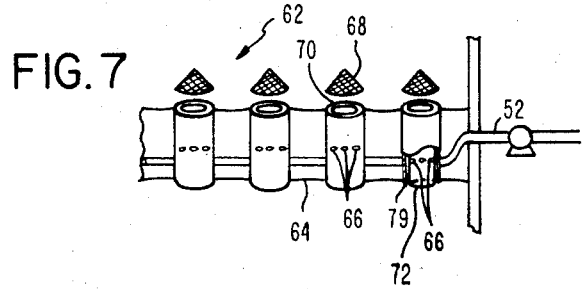
FIG. 7 shows, in semi-cutaway, semi-perspective, a distributor grid suitable for injecting fluids into or removing fluids from the distributor. Solids downflow is prevented by use of solid conical caps. No standpipe is used in this variation.
Figure 8:
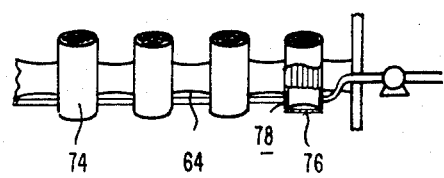
FIG. 8 is a semi-perspective, semi-cutaway of a distributor grid suitable for injecting fluids into or removing fluids from the grid. No standpipe is used in this configuration.

The variations shown in FIGS. 7 and 8 combine the functions of the standpipe, the distributor tray, and the solids protection screen in an accumulation of discrete distributors. The distributors are used and supported on a spider rather than a solid plate and, consequently, may be placed between closely adjacent MSBs. The solids are not directed to one or more standpipes, but flow directly through the spiders or interconnected spider network and along side the distributor assemblies. Said another way, the spaces between and among the spiders and distributors function much in the same way that the standpipes do in the variations of the invention shown in, e.g., FIGS. 1-4. Similarly, the solids-free zones are contained within the discrete distributors.

In FIG. 7, the distributors 62 mounted on spider 64 are each made up of a double walled, annular cylinder having orifices 66 placed in the inner annular wall. Fluid is therefore able to flow into or out of orifices 66 through the chamber formed within the annular space within distribution means 62 through the spider and in or out of lines 52. The orifices (or ports) 66 may also be placed on the outside of the distributor means 62. For countercurrent flow of solids to the fluidizing fluid, a cap 68, which may be either wire mesh or solid, is placed above the opening 70 shown in FIG. 7. A floor 72, which may be solid, open or covered on a screen, is placed on the bottom of distributor assembly 62. A solids-free zone is therefore formed either within the inner cylinder of distribution means 62 or within the annular space mentioned above. Obviously if the solids flow is cocurrent to the distributor 62, the conical caps should be placed on the bottom of the distribution means and the floor would then become the ceiling in those devices.

Figure 7A:
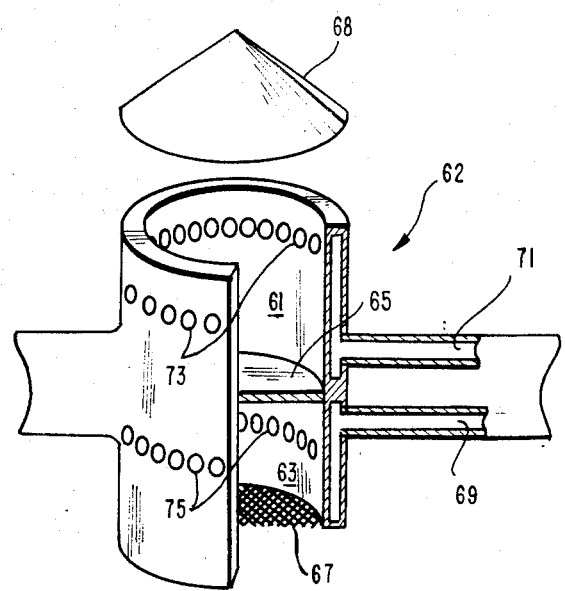
FIG. 7A shows, in semi-cutaway, a multiple chamber variation of the discrete distributor shown in FIG. 7.

FIG. 7A shows a variation of the distribution means 62 having an upper solids-free zone 61 and a lower solids free zone 63 separated by either a screen, a porous plate or solid floor 65. A lower screen 67 may be optionally placed at the lower end of lower solids-free zone 63. Fluids may be withdrawn or introduced through either of lines 69 or 71 which are in communication with the annular chambers within the distribution means 62 and, further, with the ports provided in the interior and/or the exterior of the device. Cap 68, as above, may be solid, in which case some room must be provided below the cap for fluid flow; or it may be a screen, in which case the cap may be placed directly on the upper surface of the distribution means.

The injection or withdrawal orifices shown in FIGS. 5, 6, 6A, 7 and 7A , e.g., 54 and 66, desirably are positioned to open in a radial direction so that, when used as injection orifices, they cause maximum solids-fluid mixing. Alternatively, the tubes in which the orifices are found in those drawings may be replaced by generally porous tubes.

Figure 8A:
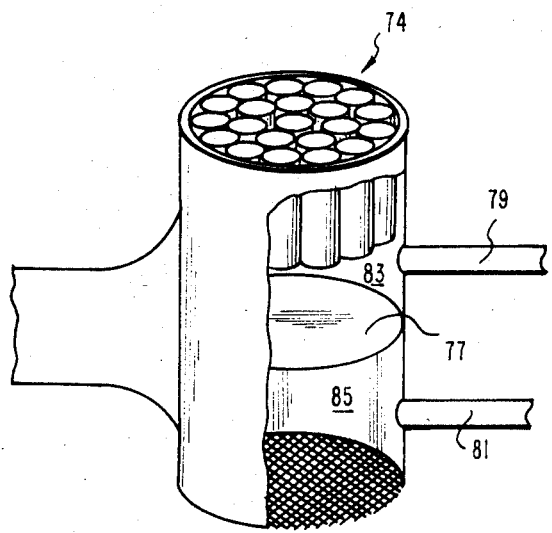
FIG. 8A shows, in semi-cutaway, a multiple chamber variation of the discrete distributor shown in FIG. 8.

The variations shown in FIGS. 8 and 8A are somewhat similar to those shown in FIG. 7 in that they are mounted on a spider 64 and, consequently, no standpipe is needed. The distribution means 74 comprise a cylinder closed at the bottom end with a number of parallel small pipes inserted in the upper end. The closed end or floor may be dispensed with or replaced with a solids excluding screen. The fluid pressure drop across the level containing the multitude of distribution means 74 will be significantly lower in those instances where the floor 76 of each distribution means 74 is a screen. Typically the spider framework will contain fluid conduit means allowing fluid to be withdrawn from or placed into the space below the ends of the upper small tubing. Such will allow zone 78 to act as a mixing chamber. Although not shown in FIGS. 8 and 8A for purposes of simplicity, screens or caps as used in the variations shown in FIGS. 5, 6 or 7 may also be used with this variation.

In FIG. 8A, the distribution means 74 may be divided into one or more solids-free zones analogous to the large zones shown in, e.g., FIG. 3. FIG. 8A shows an upper solids-free zone 83 and a lower solids-free zone 85 which may be separated by a solid, porous or screened floor 77. As above, fluids may be withdrawn or introduced through lines 79 or 81. If desired, the variation shown in any of the above Figures may be multiply stacked to provide a number of solids-free zones appropriately isolated from each other.

Figure 9:
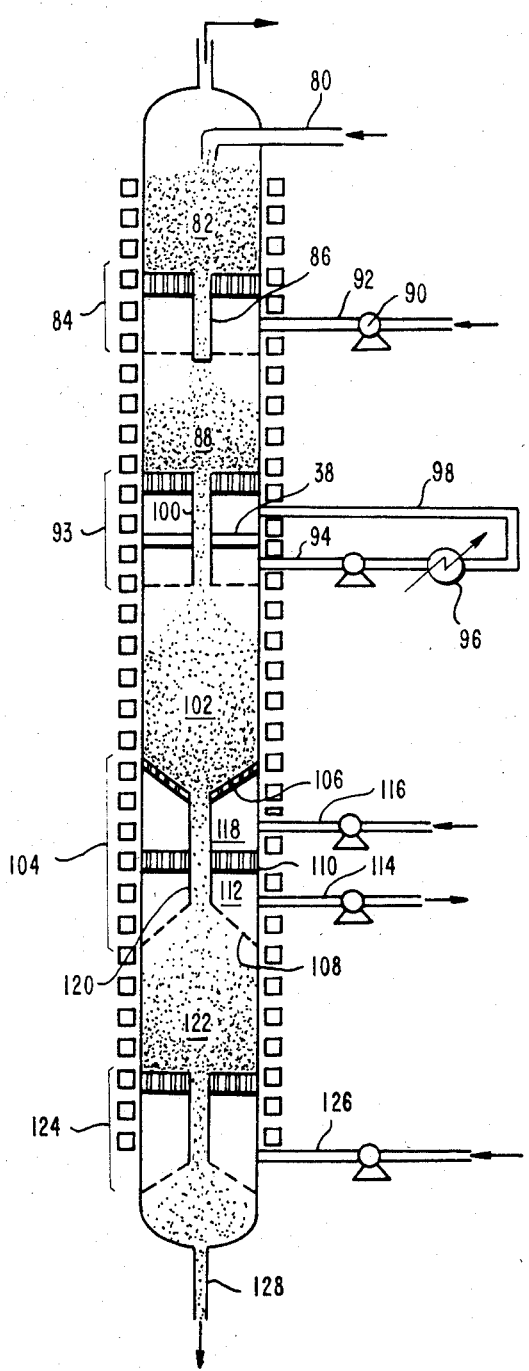
FIG. 9 shows a schematic sideview of a vessel containing four MSBs and various configurations of the buffer trays made according to this invention.

FIG. 9 shows a side view schematic cutaway example of a vessel using a number of different configurations of the disclosed invention. In this example, solids materials are introduced through solids line 80 in the upper end of the vessel. The solids are then first end up in MSB zone 82. The FRT used with MSB 82 is the one shown in FIG. 1. Solids flow through FRT 84 through standpipe 86 into MSB 88. In this example, fluid is injected into FRT 84 for mixing with the upflowing fluidizing fluid passing through that FRT. The mixed fluid is included through pump 90 and line 92.

FRT 93, included for use with MSB 88, is of the type shown in FIG. 3 having solid partition 38 placed in the middle of the solids-free zone. In this instance, all of the fluidizing fluid is withdrawn through line 94, the temperature is adjusted in heat exchanger 96 and the fluid re-enters through line 98 and thereafter fluidizes MSB 88.

As with MSB 82, the solids in MSB 88 flow down through standpipe 100 and into MSB 102. FRT 104 is of similar design to that shown in FIG. 4 above in that it includes a conical distributor grid 106 and a conical screen at its bottom 108. Further, an intermediate distributor 110 is included to define two separate solids-free zones. A fluid is withdrawn from the lower solids-free zone 112 through line 114 and another fluid is introduced into the tower through line 116 into solids-free zone 118.

The solids in MSB 102 flow down through standpipe 120 into MSB 122 where a simple FRT 124 similar in design to FRT 84 higher up in the tower is placed. Fluidizing fluid is introduced through line 126. The solids utilized in each of the MSBs fall through the standpipe in FRT 124 and exit the vessel through bottom discharge line 128.

This example is not intended to portray any specific chemical or adsorption process. It merely shows the versatility of the invention described herein.

It will be understood by those skilled in the art that various modifications of the present invention as decribed in the example may be employed without departing from the scope of the invention. Many other variations and modifications will be apparent to those skilled in this art and can be made without departing from the spirit and scope of the invention herein described.

I claim as my invention:

1. A device suitable for handling solids and fluids in conjunction with a fluidizing zone comprising in combination:
    stabilizing means disposed about at least a portion of a fluidizing zone for magnetically stabilizing solids contained in that zone;
    distributing means located below said fluidizing zone adapted to distribute a fluidizing fluid into the fluidizing zone;
    at least one standpipe means extending downwardly from at or near above the upper surface of the distributing means through a generally solids-free zone located below the distributing means, the standpipe means being adapted to allow passage of solids through the solids-free zone while preventing substantial contact between solids therein and the solids-free zone;
    separating means situated below the distributing means adapted to form, in combination with the distributing means and the standpipe means, at least one solids-free zone below the distributing means; and
    at least one fluid flow means in communication with said at least one solids-free zone.

2. The device of claim 1 wherein only a portion of the fluidizing zone is located within the stabilizing means.

3. The device of claim 1 wherein the fluidizing zone is located wholly within the stabilizing means.

4. The device of claim 1 wherein the distributing means has more than one standpipe means passing through said at least one solids-free zone.

5. The device of claim 1 wherein the distributing means comprises a sieve tray.

6. The device of claim 1 wherein the distributing means comprises a bubble-cap tray.

7. The device of claim 1 wherein the distributing means comprises a foraminous plate.

8. The device of claim 1 wherein the distributing means is generally conical.

9. The device of claim 1 wherein the distributing means, at least one standpipe means and separating means are adapted to allow upward flow of the solids.

10. The device of claim 1 wherein the distributing means, at least one standpipe means and separating means are adapted to allow downward flow of the solids.

11. The device of claim 1 wherein the separating means comprises mesh.

12. The device of claim 1 wherein the separating means is generally conical.

13. The device of claim 1 wherein partition means are located within the solids-free zone to separate the solids-free zone into at least two smaller solids-free zones.

14. The device of claim 13 wherein each smaller solids-free zone is in separate communication with at least one fluid flow means.

15. The device of claim 14 wherein the partition means comprise additional distribution means.

16. The device of claim 14 wherein the partition means comprise a plate preventing fluid flow.

17. The device of claim 1 additionally comprising at least one second stabilizing means, second distributing means, second separating means and second fluid flow means located above the fluidizing zone.

18. The device of claim 1 additionally comprising at least one second stabilizing means, second distributing means, second separating means and second fluid flow means located below the fluidizing zone.

19. A device suitable for handling solids and fluids in conjunction with a fluidized bed comprising in combination:
    stabilizing means disposed about at least a portion of a fluidizing zone for magnetically stabilizing solids, said stabilizing means being located at least partially about the fluidizing zone;
    distributing means located below said fluidizing zone adapted to distribute a fluidizing fluid into the fluidizing zone, said distributing means comprising an upper surface and a lower surface and having between the upper and lower surfaces a first solids-free zone and having passageway means intersecting the upper and lower surfaces, said passageway means having open fluid ports in communication with the first solids-free zone;

at least one standpipe means extending between the upper surface of the distributing means to the lower surface of distributing means, the standpipe means being adapted to allow passage of solids through the solidsfree zone while preventing substantial contact between the solids therein and the solids free zone, and at least one fluid flow means in communication with at least one solids-free zone.

20. The device of claim 19 wherein only a portion of the fluidizing zone is located within the stabilizing means.

21. The device of claim 19 wherein the fluidizing zone is located wholly within the stabilizing means.

22. The device of claim 19 wherein the distributing means has more than one standpipe means passing through at least one solids-free zone.

23. The device of claim 19 wherein the distributing means and at least one standpipe means are adapted to allow upward flow of the solids.

24. The device of claim 19 wherein the distributing means and at least one standpipe means are adapted to allow downward flow of the solids.

25. The device of claim 23 wherein means to substantially prevent the flow of solids through the passageway means are placed beneath the passageway means.

26. The device of claim 25 wherein the means to substantially prevent the flow of solids comprise conical mesh caps.

27. The device of claim 25 wherein the means to substantially prevent the flow of solids comprise generally solid hemispherical caps separated from the lower surface.

28. The device of claim 24 wherein means to substantially prevent the flow of solids through the passageway means are placed above the passageway means.

29. The device of claim 28 wherein the means to substantially prevent the flow of solids comprise conical mesh caps.

30. The device of claim 28 wherein the means to substantially prevent the flow of solids comprise generally solid hemispherical caps separated from the lower surface.

31. The device of claim 19 additionally comprising at least one second stabilizing means, second distributing means, and second fluid flow means located above the fluidizing zone.

32. The device of claim 19 additionally comprising at least one second stabilizing means, second distributing means and second fluid flow means located below the fluidizing zone.

33. The device of claim 19 wherein said distributing means comprises at least one additional solids-free zone located below the first solids-free zone and having passageway means therethrough in essentially colinear relationship with the passageway means passing through said first solids-free zone, said passageway means having open fluid ports in communication with said additional solids-free zones, and said additional solids-free zones in communication with at least one additional fluids flow means.

* * * * *